United States Patent [19]

Hillson

[11] Patent Number: 4,601,506

[45] Date of Patent: Jul. 22, 1986

[54] CABLE COUPLER FOR TREE SKIDDING CABLES

[76] Inventor: Murray G. Hillson, P.O. Box 2932, Salmon Arm, British Columbia, Canada, V0E 2T0

[21] Appl. No.: 741,837

[22] Filed: Jun. 6, 1985

[30] Foreign Application Priority Data

Apr. 26, 1985 [CA] Canada .................................. 480190

[51] Int. Cl.⁴ ............................................. B66C 1/14
[52] U.S. Cl. .................................... 294/82.14; 294/74
[58] Field of Search .................. 294/82.14, 74, 82.11; 24/134 WL, 135 R, 453, 115 R, 114.5; 403/353, 381, 301, 305

[56] References Cited

U.S. PATENT DOCUMENTS 1,643,362  9/1927  Ashdown .............................. 294/74
3,069,738  12/1962  Nelson .............................. 294/82.14

Primary Examiner—James B. Marbert
Attorney, Agent, or Firm—Perry Carvellas

[57] ABSTRACT

In a tree skidding arrangement comprising a mainline secured to the winch of a line skidder and having a number of chokers secured to sliders which are freely slidable along the mainline, the last choker is secured to the mainline through a cable coupler. The coupler is formed in two parts which can be screwed together and each of which has an orifice therethrough for respectively accommodating a mainline ferrule and a choker ferrule. At least the part accommodating the choker ferrule has a smoothly tapered or rounded nose portion, which minimizes the tendency of the coupler to snag on trees or bushes.

14 Claims, 3 Drawing Figures

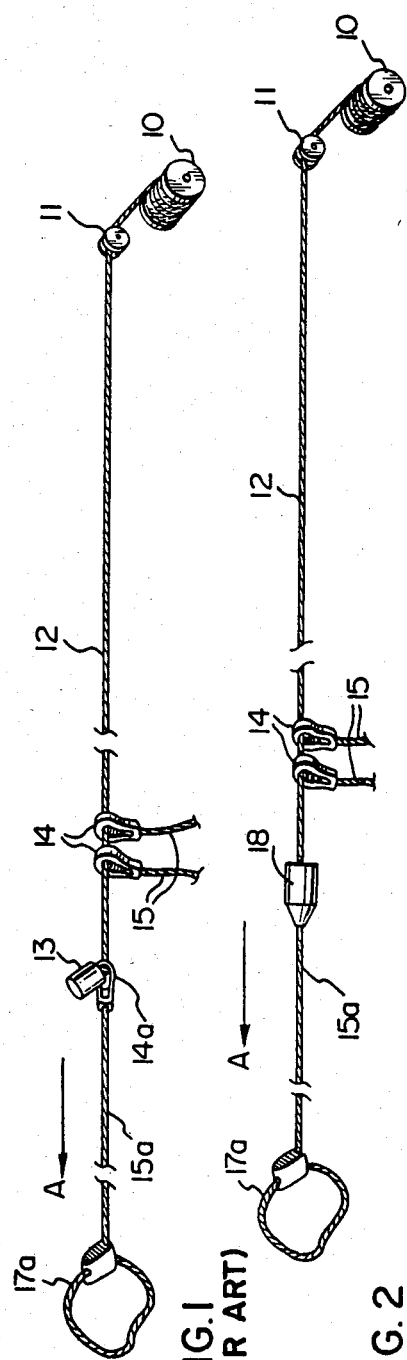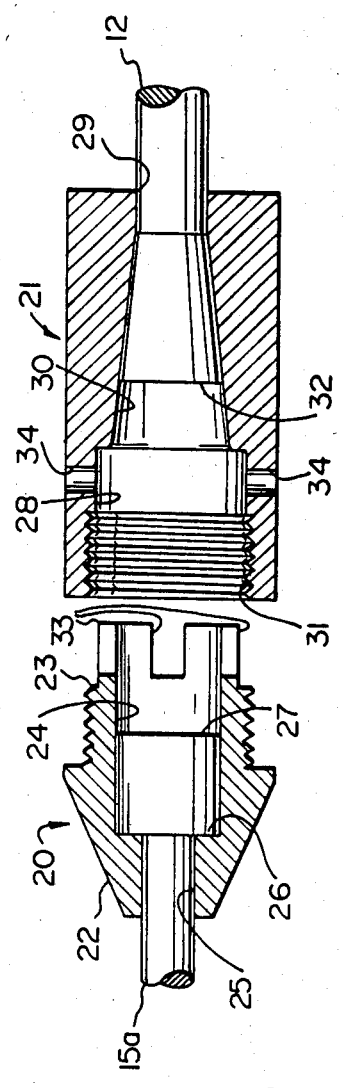

CABLE COUPLER FOR TREE SKIDDING CABLES

This invention relates to a cable coupler for tree skidding cables.

In a logging operation, felled trees are customarily skid to a landing where the trees are processed into logs. A number of trees are hauled simultaneously by means of a line skidder, which is a large rubber-tired tractor equipped with a winch and a cable arrangement. The latter consists of a main cable or "main line", which wraps around the winch drum, and a plurality of relatively short pieces of cable, known as "chokers", which are attached between the main line and slings which are secured to the individual trees. These chokers are usually terminated with sliders through which the main line passes and which allow free movement of the individual chokers along the main line. A cable ferrule, known as a "mainline knob" is attached to the free end of the mainline to keep the choker sliders on the mainline.

A problem which has been encountered with this conventional arrangemet (and which will be illustrated hereinafter in greater detail) is that as the last choker is dragged to the furthest tree to be hauled, the knob tends to be pulled sideways and to form a "vee", which snags upon bushes and the like. Also, during skidding of the trees, there is a tendency for the mainline to kink due to pressure applied by the last slider in the line against the mainline knob and this increases wear and reduces the service life of the mainline.

It is therefore an object of the invention to provide an improved means of securing all the required chokers to the mainline and maintaining their freedom to slide therealong whilst avoiding the problems described above.

According to the invention, the last choker is rigidly secured to the mainline by means of a cable coupler which maintains itself in alignment with the mainline and also functions to prevent the remaining chokers from sliding free of the mainline. Thus, the cable eliminates the hang-up caused by the protruding knob of the conventional arrangement and also eliminates the kinking of the mainline by maintaining a substantially linear orientation between the mainline and the coupler.

The coupler of the invention comprises first and second generally cylindrical parts, each having an orifice extending axially therethrough for accommodating a cable ferrule and each orifice being of circular cross-section and having a constricted region of smaller diameter than the largest diameter of the cable ferrule to be located therein. The parts are coaxially threadedly engageable with one another by means of complementarily formed sets of male and female threads respectively formed adjacent the extremities of the parts remote from the constricted regions of the orifices. At least one of the orifices and its associated ferrule is of circular cross-section to permit relative swivelling between the cables being joined.

According to a further aspect of the invention, a tree skidding arrangement comprises a mainline secured to a motive power supply, a choker having a sling for securement to a lumber piece (such as a tree) and a cable coupler for joining the free ends of the mainline and the choker. The choker comprises first and second generally cylindrical parts, each having an orifice extending axially therethrough for accommodating a cable ferrule respectively secured to the free end of the mainline or the choker and each orifice being of circular cross-section and having a constricted region of smaller diameter than the largest diameter of the cable ferrule to be located therein. The parts are coaxially threadedly engageable with one another by means of complementarily formed sets of male and female threads respectively formed adjacent the extremities of the parts remote from the constricted regions of said orifices. At least the part accommodating the choker ferrule has a smoothly tapered or rounded nose portion diminishing in cross-section towards the choker and at least on of the orifices and its associated ferrule is of circular cross-section to permit relative swivelling between the mainline and choker.

The invention will now be described further by way of example only and with reference to the accompanying drawings, wherein:

FIG. 1 shows a skidding arrangement in accordance with the prior art;

FIG. 2 shows a tree skidding arrangement utilizing a cable coupler in accordance with the present invention; and FIG. 3 is a sectional side elevation of the cable coupler shown in FIG. 2.

Considering firstly FIG. 1 of the drawings, a winch 10 and fairlead roller 11 are mounted upon a line skidder (not shown). A mainline 12 is wrapped around the winch 10 and terminates at its free end in a mainline knob 13. A number of sleeves 14 are slidably mounted upon the mainline 13 and each sleeve has a choker cable 15 secured thereto. The cables 15 are fastened to felled tree trunks by means of slings. The skidder operator drives his machine to the felled trees and the winch 10 is put on "freewheel" and the last choker 15a is pulled to the farthest tree, dragging the mainline with it. The mainline and the choker 15a are under tension as the sling 17a is hauled in the direction of the arrow A. In this condition, the loading of the choker 15a upon the free end of the mainline 12 through the sleeve 14a causes the mainline to be distorted and the unrestrained knob 13 to be pulled around until it is projecting out of the line of travel and thus forms a "vee" which creates a significant obstacle to the smooth passage of the mainline and the chokers through bushes and other obstacles upon which the knob 13, particularly, is likely to snag. Furthermore, the strain imposed upon the distorted portion of the mainline causes kinking of the line and consequent wear and reduction of its service life.

Referring ow to FIG. 2, the overall arrangement is precisely as in FIG. 1 with the important difference that the knob 13 and the last sleeve 14a are replaced by cable coupler 18 in accordance with the present invention. The coupler is generally cylindrical with a tapered nose portion 22. Since the forward end of the coupler is secured to the choker 15a and the rearward end to the mainline 12, pulling on the choker now creates equal tension upon the ends of the coupler which maintains the coupler in alignment with the choker and the mainline. Also, the tapered profile of the nose portion ensures that any obstacles such as branches and the like are deflected past the coupler rather than snagging thereagainst. The coupler is also relatively compact and short and therefore is able to pass easily over the fairlead roller 11 and winch 10 (which are drawn to a smaller scale than the remainder of the elements of FIGS. 1 and 2).

FIG. 3 shows the preferred form of coupler according to the invention, wherein the coupler is in two hollow parts 20 and 21. Part 20 has a nose portion 22 of conical cross-section having a rearwardly extending coaxial, cylindrical, male-threaded extension 23. Extension 23 has a cylindrical central passage 24 therethrough which is coextensive with cylindrical central passage 25 through the nose portion 22. The passage 25 is of lesser diameter than passage 24 and the separation therebetween is defined by an annular shoulder 26. The diameter of passage 25 is selected to accommodate choker 15a and the diameter of passage 24 is selected to accommodate a ferrule 27 secured to the end of choker 15a.

Part 21 has a central passage therethrough which comprises a first cylindrical section 28 of relatively large diameter, a second cylindrical section 29 of relatively small diameter and a tapered section 30 extending between sections 28 and 29. Extending inwardly of section 28 for a sufficient distance to accommodate the threaded extension 23 of coupling part 20 is a female-threaded portion 31 which is complementary with the male threads of extension 23. The diameter of passage section 29 is selected to accommodate a mainline 12 and the taper and dimensions of section 30 are selected to accommodate a complementarily tapered ferrule 32 secured to the end of mainline 12.

Thus, coupling parts 20 and 21 are retained upon the choker 15a and mainline 12, respectively, by the respective ferrules 27 and 32 and to couple choker 15a to mainline 12 it is necessary only to engage the threaded extension 23 with the threaded portion 31 of passage section 28 and rotate one or both of the coupling parts about the choker and/or mainline to screw the parts together. Radially opposed pairs of slots 33 are provided in the threaded extension 23 and radially opposed holes 34 are provided in the part 21 so that a cotter pin or the like can be inserted through the holes in registry with the slots 33 to prevent the coupler parts from becoming unscrewed during use.

The embodiments of the invention in which an exclusive property or privilege is claimed are defined as follows:

1. A cable coupler for tree skidding cables comprising first and second generally cylindrical parts, each having an orifice extending axially therethrough for accommodating a cable ferrule and each said orifice being of circular cross-section and having constricted region of smaller diameter than the largest diameter of the cable ferrule to be located therein, said parts being coaxially threadedly engageable with one another by means of complementarily formed sets of male and female threads respectively formed adjacent the extremities of said parts remote from said constricted regions of said orifices, at least one of said orifices and its associated ferrule being of circular cross-section to permit relative swivelling between the cables being joined.

2. A cable coupler as defined in claim 1, wherein said first part bears said male threads and is further provided with a series of diametrically opposed slots formed adjacent said male threads and said second part bears said female threads and is formed with at least a pair of diametrically opposed holes adjacent said female threads, said holes aligning with pairs of opposed said slots when said parts are screwed together to enable insertion of a pin therethrough to restrain relative rotation and consequent unscrewing of said parts.

3. The cable coupler of claim 1, wherein said orifice through said first part is formed in at least two sections, each being of uniform diameter and a first of said sections being of greater diameter than a second of said sections and adapted to accommodate a complementarily shaped cable ferrule therein, said first section being bound by a wall region of said first part bearing said male threads.

4. The cable coupler of claim 1, wherein said orifice through said second part is formed in at least two sections, a first of said sections being of uniform diameter and bound by a wall region of said second part bearing said female threads, and a second of said sections extending away from said first section with a smoothly diminishing cross-section to form a tapered profile adapted to accommodate a complementarily shaped cable ferrule.

5. The cable coupler of claim 1, wherein at least one said part has a smoothly tapered or rounded nose portion diminishing in cross-section towards the respective cable accommodated thereby.

6. A tree skidding arrangement comprising a mainline secured to a motive power source, a choker having a sling for securement to a lumber piece, and a cable coupler for joining the free ends of said mainline and said choker and comprising first and second generally cylindrical parts, each having an orifice extending axially therethrough for accommodating a cable ferrule respectively secured to the free end of the mainline or the choker and each said orifice being of circular cross-section and having a constricted region of smaller diameter than the largest diameter of the cable ferrule to be located therein, said parts being coaxially threadedly engageable with one another by means of complementarily formed sets of male and female threads respectively formed adjacent the extremities of said parts remote from said constricted regions of said orifices, at least the part accommodating said choker ferrule having a smoothly tapered nose portion diminishing in cross-section towards said choker and at least one of said orifices and its associated ferrule being of circular cross-section to permit relative swivelling between the mainline and choker.

7. The arrangement of claim 6, wherein said first part accommodates said choker ferrule and bears said male threads and is further provided with a series of diametrically opposed slots formed adjacent said male threads and said second part accommodates said mainline ferrule and bears said female threads and is formed with at least a pair of diametrically opposed holes adjacent said female threads, said holes aligning with pairs of opposed said slots when said parts are screwed together to enable insertion of a pin therethrough to restrain relative rotation and consequent unscrewing of said parts.

8. The arrangement of claim 6, wherein said orifice through said first part is formed in at least two sections, each being of uniform diameter and a first of said sections being of greater diameter than a second of said sections and adapted to accommodate a complementarily shaped choker ferrule therein, said first section being bound by a wall region of said first part bearing said male threads.

9. The arrangement of claim 6, wherein said orifice through said second part is formed in at least two sections, a first of said sections being of uniform diameter and bound by a wall region of said second part bearing said female threads, and a second of said sections extending away from said first section with a smoothly diminishing cross-section to form a tapered profile adapted to accommodate a complementarily shaped mainline ferrule.

10. The arrangement of claim 6, wherein said motive power source is a tractor.

11. The arrangement of claim 10, wherein said tractor is a line skidder having a winch to which said mainline is secured.

12. The cable coupler of claim 1, wherein said orifice through said first part is formed in at least two sections, each being of uniform diameter and a first of said sections being of greater diameter than a second of said sections and adapted to accommodate a complementarily shaped cable ferrule therein, said first section being bound by a wall region of said first part bearing said male threads; and said orifice through said second part is formed in at least two sections, a first of said sections being of uniform diameter and bound by a wall region of said second part bearing said female threads, and a second of said sections extending away from said first section with a smoothly diminishing cross-section to form a tapered profile adapted to accommodate a complementarily shaped ferrule.

13. The arrangement of claim 6, wherein said orifice through said first part is formed in at least two sections, each being of uniform diameter and a first of said sections being of greater diameter than a second of said sections and adapted to accommodate a complementarily shaped choker ferrule therein, said first section being bound by a wall region of said first part bearing said male threads; and said orifice through said second part is formed in at least two sections, a first of said sections being of uniform diameter and bound by a wall region of said second part bearing said female threads, and a second of said sections extending away from said first section with a smoothly diminishing cross-section to form a tapered profile adapted to accommodate a complementarily shaped mainline ferrule.

14. A tree skidding arrangement comprising a mainline secured to a motive power source, a choker having a sling for securement to a lumber piece, and a cable coupler for joining the free ends of said mainline and said choker and comprising first and second generally cylindrical parts, each of said first and second parts having an orifice extending axially therethrough for accommodating a cable ferrule respectively secured to the free end of the mainline or the choker and each said orifice being of circular cross-section and having a constricted region of smaller diameter than the largest diameter of the cable ferrule to be located therein, said parts being coaxially threadedly engageable with one another by means of complementarily formed sets of male and female threads respectively formed adjacent the extremities of said parts remote from said constricted regions of said orifices, at least the part accommodating said choker ferrule having a smoothly tapered nose portion diminishing in cross-section towards said choker and at least one of said orifices and its associated ferrule being of circular cross-section to permit relative swivelling between the mainline and choker; said first part accommodate said choker ferrule and bears said male threads and is further provided with a series of diametrically opposed slots formed adjacent said male threads and said second part accommodates said mainline ferrule and bears said female threads and is formed with at least a pair of diametrically opposed holes adjacent said female threads, said holes aligning with pairs of opposed said slots when said parts are screwed together to enable insertion of a pin therethrough to restrain relative rotation and consequent unscrewing of said parts; said orifice through said first part is formed in at least two sections, each being of uniform diameter and a first of said sections being of greater diameter than a second of said sections and adapted to accommodate a complementarily shaped choker ferrule therein, said first section being bound by a wall region of said first part bearing and said male threads; and said orifice through said second part is formed in at least two sections, a first of said sections being of uniform diameter and bound by a wall region of said second part bearing said female threads, and a second of said sections extending away from said first section with a smoothly diminishing cross-section to form a tapered profile adapted to accommodate a complementarily shaped mainline ferrule.

* * * * *